United States Patent [19]

Bliss et al.

[11] Patent Number: 5,072,395
[45] Date of Patent: Dec. 10, 1991

[54] NAVIGATION SYSTEM WITH EASILY LEARNED DESTINATION SELECTION INTERFACE

[75] Inventors: Harry M. Bliss, Chicago; Larry C. Puhl, Sleepy Hollow, both of Ill.

[73] Assignee: Motorola, Inc., Schaumburg, Ill.

[21] Appl. No.: 508,882

[22] Filed: Apr. 12, 1990

[51] Int. Cl.$^5$ ............................................ G06F 15/50
[52] U.S. Cl. .................................. 364/443; 364/444
[58] Field of Search ...................... 364/443, 444, 449; 340/988, 990, 995; 73/178 R

[56] References Cited

U.S. PATENT DOCUMENTS

| | | | |
|---|---|---|---|
| 3,899,671 | 8/1975 | Stover | 235/150 |
| 4,570,227 | 2/1986 | Tachi et al. | 364/444 |
| 4,677,561 | 6/1987 | Akama et al. | 364/449 |
| 4,733,356 | 3/1988 | Haeussermann et al. | 364/443 |
| 4,782,447 | 1/1988 | Ueno et al. | 364/449 |
| 4,827,419 | 5/1989 | Selby, III | 364/443 |
| 4,954,959 | 9/1990 | Moroto et al. | 364/444 |

OTHER PUBLICATIONS

"Direction Assistance", Davis et al., (12/87) (MIT) pp. 1–16.
"A Voice Interface to a Direction Giving Program", Davis (1/87) (MIT) pp. 1–9.

Primary Examiner—Salvatore Cangialosi
Attorney, Agent, or Firm—Steven G. Parmelee

[57] ABSTRACT

A navigation system having a destination selection input mechanism that can be readily and rapidly used by an inexperienced user. The display (103) and user input (102) are physically configured and controllably intercoupled to support the conveyance of an impression to the inexperienced user that the information displayed can be selectively altered one field at a time in a precessing manner through appropriate use of the input unit (102). In one embodiment, selection of information for one field as pertains to a particular desired location destination will limit the information values that can be selected for remaining unselected information fields.

16 Claims, 4 Drawing Sheets

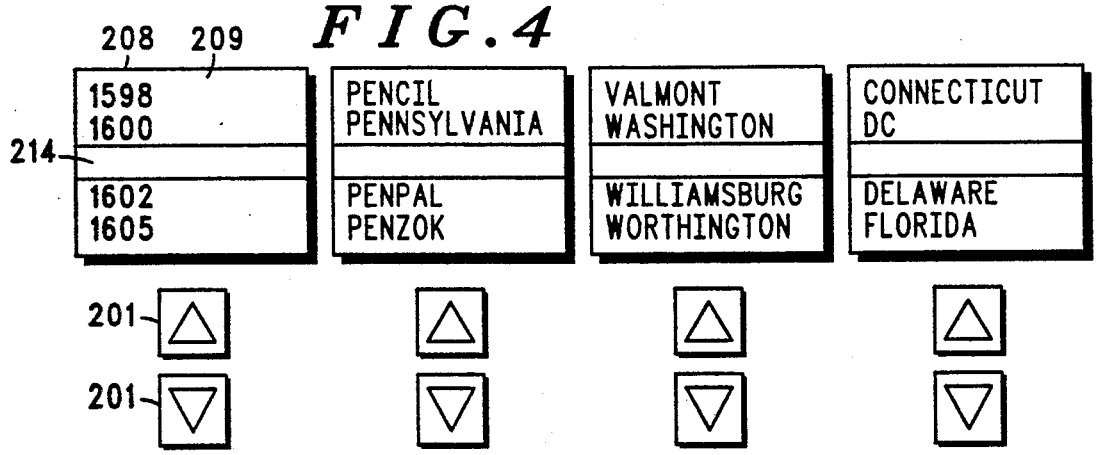

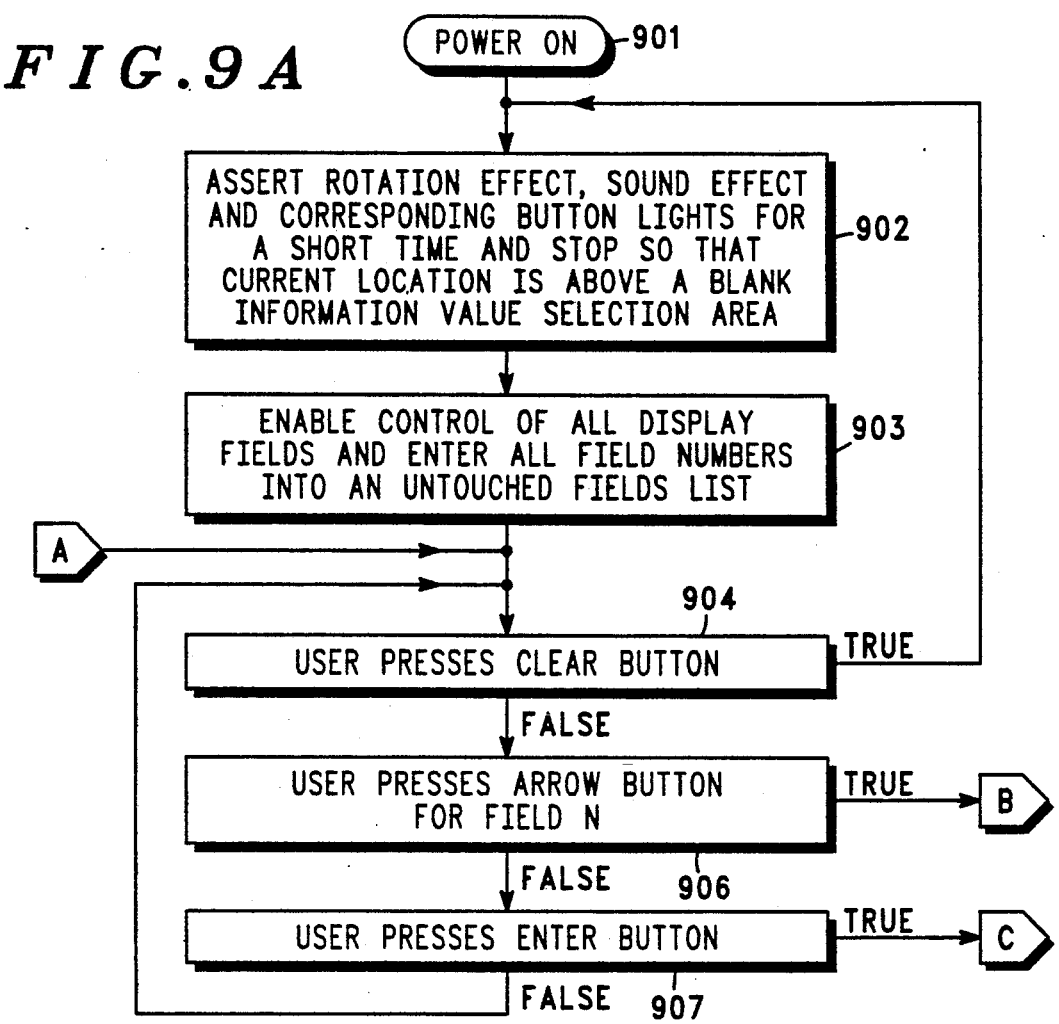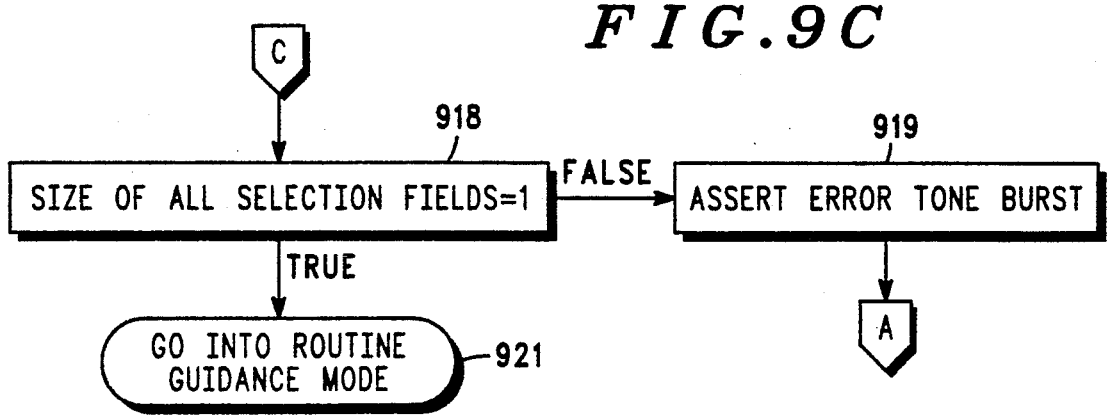

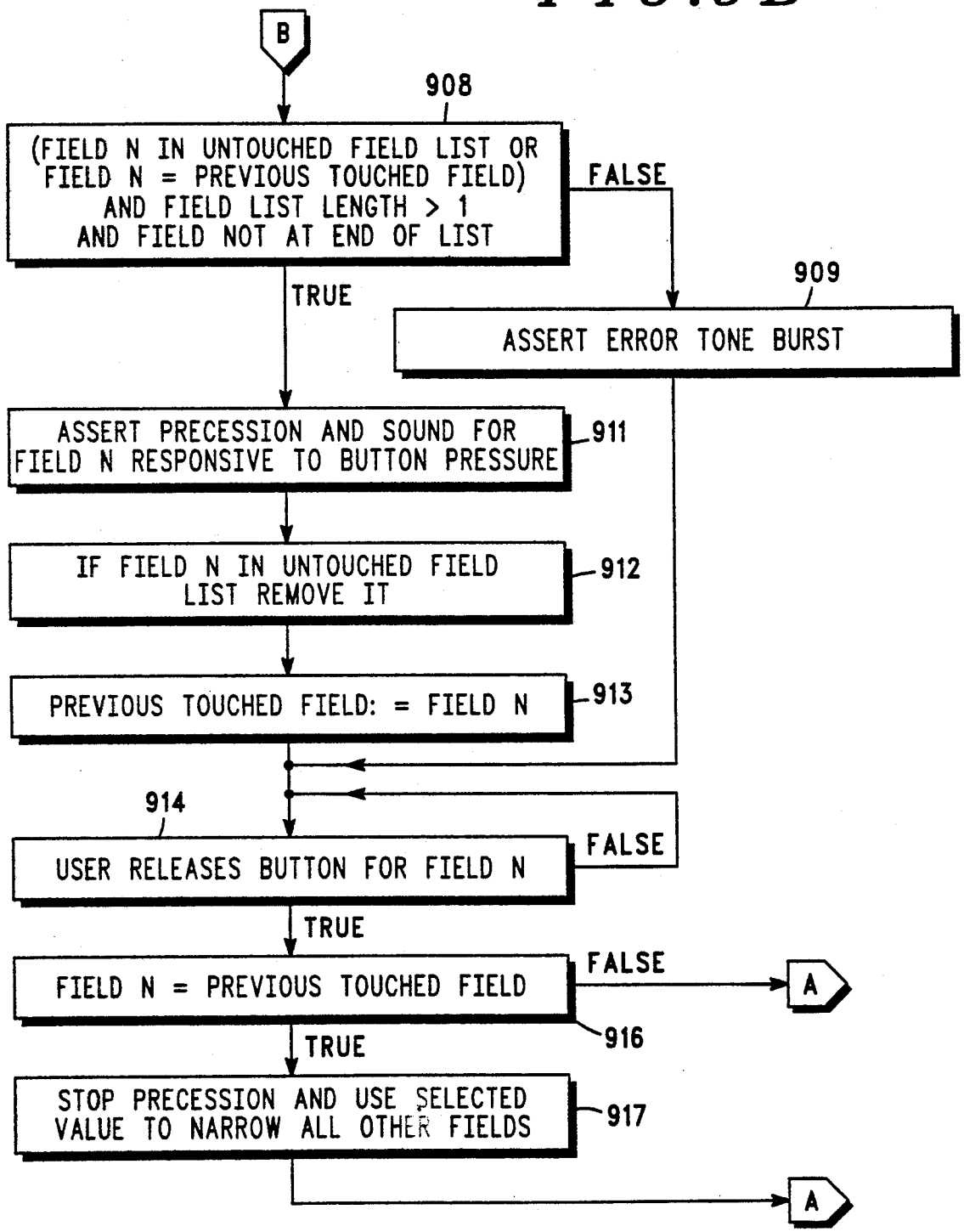

5,072,395

NAVIGATION SYSTEM WITH EASILY LEARNED DESTINATION SELECTION INTERFACE

TECHNICAL FIELD

This invention relates generally to navigation systems for use in conjunction with moving objects, and more particularly to a user interface that allows a user to select a desired destination.

BACKGROUND OF THE INVENTION

Various navigation systems for use with moving objects are known. Generally, though not always, the system includes an appropriate mechanism for allowing the current location of the moving object to be ascertained, and to use that information in some manner to provide the user with instructions regarding appropriate subsequent maneuvering. In general, for a navigation system to offer much utility, a mechanism must be provided to allow the user to select a desired destination from amongst a plurality of potential destinations.

One prior art system provides a keyboard that a user operates to enter desired destination information. Such a system is objectionable for a variety of reasons, not the least of which is that many persons are unfamiliar with keyboards and are not able to manipulate them in an accurate and convenient manner without significant training.

Other prior art systems provide menu based address information selection, requiring the user to select alphanumeric characters one at a time from a palette of available characters. This approach is both time consuming and again, many users are not initially conversant nor proficient with such a data entry mechanism.

Other data selection and/or entry mechanisms are of course known in a more general context. For example, the use of a mouse in conjunction with a display screen offering a plurality of choices that may be selected by the mouse, as exemplified by the Smalltalk browser utility (as offered by Zerox Corporation) has useful applicability in many circumstances. Such an approach is a poor choice in a navigation system, however, both because of physical limitations and because many individuals are not skilled in mouse control or mouse driven selection techniques, again forcing a training requirement upon the inexperienced navigation system user.

For all of these reasons, a need exists for an apparatus and method to allow desired destination information to be input to a navigation system by an inexperienced user without requiring antecedent training. Preferably, only those skills typically associated with operating a vehicle should be anticipated as those skills that will be available in the inexperienced user.

SUMMARY OF THE INVENTION

This need and others are substantially met through provision of the navigation system disclosed herein. Pursuant to this invention, the navigation system provides a display and an input mechanism that are constructed and arranged with respect to one another so as to likely quickly convey an impression to an inexperienced user as to the proper way to select a desired destination location from amongst a group of potential destination locations.

In one embodiment, the potential destination locations are each parsed into a plurality of information fields, which constitute discrete elements of the potential destination location information. For example, one information field might include the numeric portion of a street address, while another information field could include the street name itself.

When first activated, the navigation system can cause a precessing display of a plurality of information values for one or more of the information fields, thereby suggesting to the user that these information values are manipulated by precessing. Simultaneously, as these information values are automatically precessing, an appropriate visual indicia can be provided in conjunction with an input mechanism to suggest to the user that the input mechanism is associated with the precessing occurring on the display.

So constructed and arranged, the initial precessing and signal indications tend to quickly convey an impression to an inexperienced user that the information displayed can be selectively altered in a precessing manner through use of the input mechanism. This impression leads the user to correct usage of the navigation system notwithstanding unfamiliarity on the part of the user with the system and a lack of training in general regarding navigation systems or data entry.

BRIEF DESCRIPTION OF THE DRAWINGS

FIGS. 3–8 comprise various depictions of the display and input mechanisms during use of the navigation system in accordance with the invention; and FIG. 9a–c comprises a flow diagram depicting operation of one aspect of the navigation system in accordance with the invention.

BEST MODE FOR CARRYING OUT THE INVENTION

Figure 1:
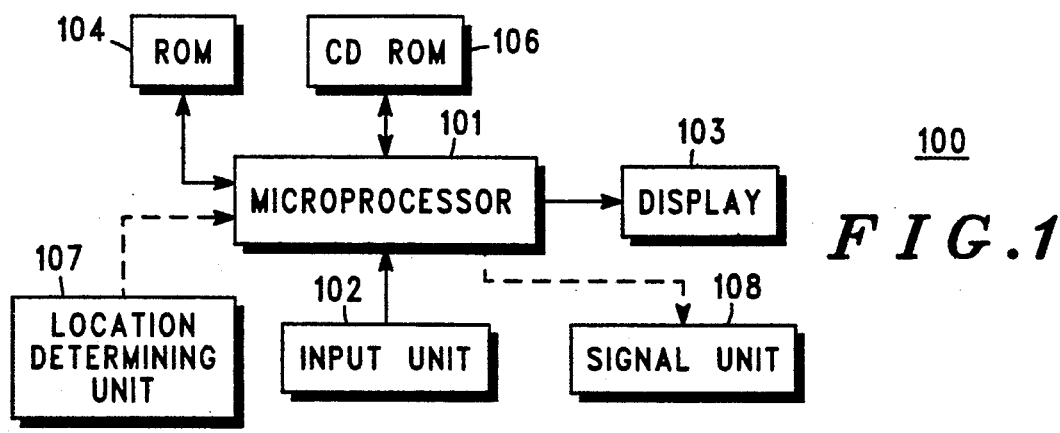
FIG. 1 comprises a block diagram depiction of one embodiment of a navigation system in accordance with the invention.

In FIG. 1, a navigation system configured in accordance with the invention can be seen as depicted generally by the reference numeral 100. The navigation system (100) includes generally a microprocessor (101), an input unit (102), a display (103), a ROM (104), and a CD ROM (106). The microprocessor (101) may be, for example, a 68030 as manufactured by Motorola, Inc. The microprocessor is programmed appropriately to interface with and control the various other coupled elements in order to provide the desired navigation functions. The input unit (102) includes one or more operator manipulable switches, which preferably include multi-position push switches and/or variable pressure sensitive switches. In the alternative, the input unit (102) could be comprised of an appropriate speech recognition unit in accordance with prior art technique.

The display (103) can be comprised of LCD elements, LED elements, electroluminescent elements, or a CRT display. Other display technologies could be used as well, as might be appropriate in a particular application.

The ROM (104) would hold the various programs accessed by the microprocessor (101) to sustain the various information processing tasks that support the navigation functions.

The CD ROM (106) would contain potential destination location information. Preferably, the latter information would be parsed into information fields, each field typically comprising a discrete element of a potential destination location address. For example, one information field could contain the numeric portion of a street address, while another information field could contain the street name itself. Other elements and/or criteria could also be utilized as part or all of the potential destination location information, including but not limited to phone numbers, zip-codes, landmark identifiers, street intersections, and aliases, the latter being either user entered or system pre-established.

If desired, and as appropriate to a particular application, the navigation system (100) could also include a location determining unit (107) that provides information to the microprocessor (101) regarding the current location of the object being monitored. The location determining unit (107) could be realized through provision of a Loran C unit, a global positioning satellite responsive system, or a dead reckoning based system, or by any combination of the above, all as well understood in the art.

In addition, and as appropriate to at least one embodiment of this invention, a signal unit (108) can be provided to furnish a user with visual, audible, and/or tactile information regarding the operational status of the system, as described below in more detail.

Figure 2:
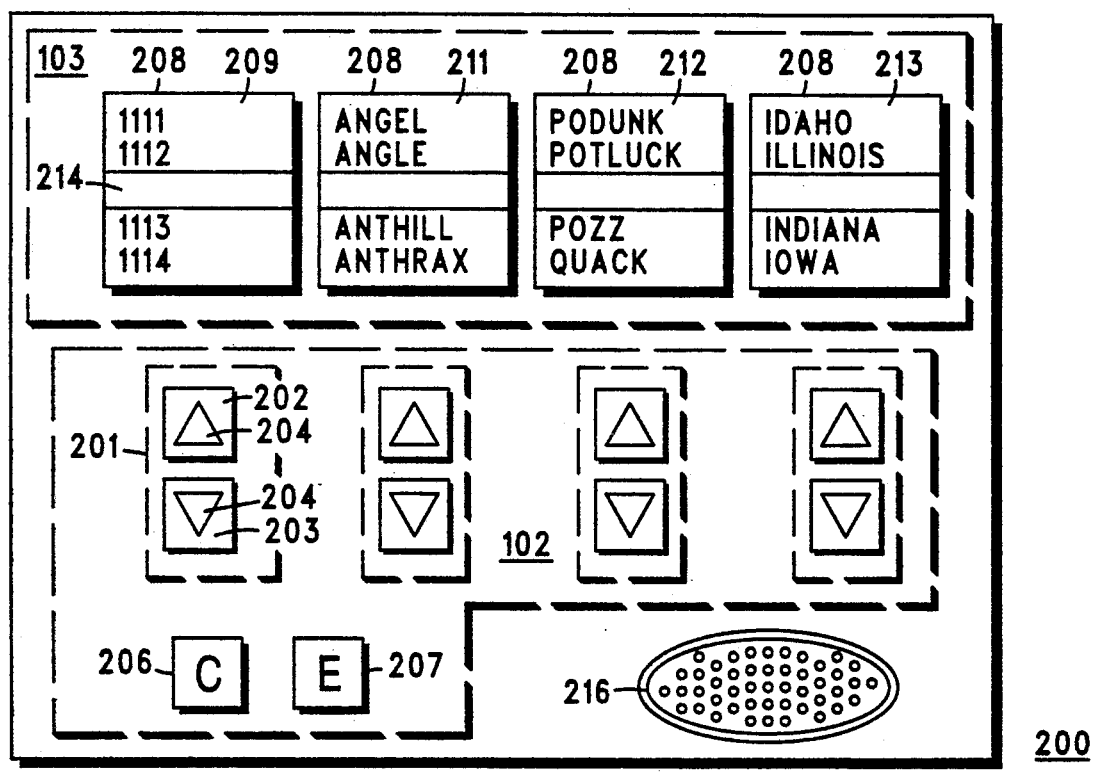
FIG. 2 comprises a depiction of a front panel of a navigation system that incorporates the invention.

In FIG. 2, a display and input panel is generally depicted by the reference numeral 200. The panel (200) generally supports the display (103) and the input unit (102).

The input unit (102) includes, in this embodiment, four pairs (201) of user operable destination selection switches (202 and 203). These switches are preferably variable pressure sensitive switches that provide information to the microprocessor (101) regarding not only which switch has been activated, but with how much pressure. Through proper interpretation of this information, the microprocessor (101) can alter the control effected by the switches in response to the amount of pressure provided by the user. Each switch (202 and 203) includes an arrow shaped indicia (204) formed thereon, with the direction of the arrow (204) being oriented to conform with a display precessing direction associated with that switch (202 or 203). In addition, if desired, some portion of the switch (202 and 203) can include a light (for example, the arrowhead indicia (204) can be selectively illuminated) to indicate current functioning of that switch.

In addition to these switch pairs (201), a clear switch (206) and an enter switch (207) can be provided to support other operating capabilities of the navigation system (100).

The display (103) includes a group of display areas (208) that are segregated from one another, such that each display area (208) functions to display information values for a preselected potential destination location information field. For example, in the embodiment depicted, the first display area (209) displays numeric information values, the second area (211) displays street name information values, the third area (212) displays town or city information values, and the fourth area (213) displays state information values.

It will be noted that the display areas (208) are of sufficient size to allow simultaneous display of a plurality of information values in each discrete information field. For example, the first display area (209) can simultaneously display the information values "1111," "1112," "1113," and "1114." Each display area (208) also has an information value selection area (214) that will ultimately contain the selected information values that correspond to the desired destination location.

Additional details regarding operable interaction between the display (103) and the input unit (102) will be made more clear below. It should be noted here, however, that each display area (208) has positioned proximal thereto a corresponding pair of destination selection switches (201).

The panel (200) in this embodiment also includes a speaker (216) that can provide audible signals for purposes described below.

Figure 3:
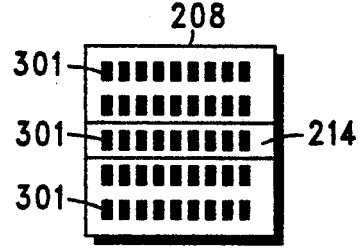
Figure 3:
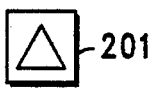
Figure 3:

When first initiated, the navigation system (100), as controlled via the microprocessor (101), will cause the information values (301) (see FIG. 3) as displayed on at least some of the display areas (208) to precess rapidly (in this embodiment, downwardly). If desired, and as depicted in this embodiment, the precessing information (301) can scroll through the information value selection area (214) as well as the other areas within the display area (208) where the information values for this field are usually displayed. (In the alternative, rather than literally precessing the information, the display can provide an initial blurred or flashing depiction of information, followed by a more discernable precessing display. It is not important that the entire display actually be precessing, so long as the visual impression conveyed is one of precessing.) By causing the information values to appear to precess initially, an impression is quickly conveyed to an inexperienced user that the information displayed is selectively alterable through a precessing methodology.

At the same time that the information precesses, the arrowhead (204) associated with the destination selection switch (203) that corresponds to the direction of precessing apparent on the display area (208) is illuminated to thereby provide the user with a visually perceptible signal. Provision of this signal in this manner supports a quick conveyance of an impression to the inexperienced user that the information displayed is caused to precess via the input switch (203).

So constructed and arranged, the input switches and the display areas are physically interrelated in a manner that suggests an inter-operable relationship therebetween. This impression is substantially reinforced through provision of the automatic display precessing and destination selection switch operability visual aid that are provided as described above. If desired, the speaker (216) can provide an appropriate noise to accompany the precessing display in order to reinforce the thought in the mind of the inexperienced user that the information displayed in the displayed areas will vary through a precessing action.

Following the above described automatic precessing presentation, on one or more of the display areas (208), the display will present an initial quiescent information value array, for example as depicted in FIG. 4. In one embodiment of the invention, and as depicted, this initial display renders the information value selection area (214) void of information value information for each of the information fields.

Also as depicted in this embodiment, the information values just above and adjacent to the information value selection areas (214) comprise the most recently entered desired destination location. In the example depicted, this would means that 1600 Pennsylvania, Washington, D.C. would have been the most recently entered desired destination. The other information values depicted in each of the display areas (208) are simply the next most adjacent valid information values for each of the particular fields. For example, in the first display area (209) there are no "1599" information values stored in the CD ROM (106). There is, however, a "1598" numeric address, and hence this number is displayed above the "1600" information value. Similarly, the numbers "1602" and "1605" represent other numeric information values that are stored in the CD ROM (106) for this particular information field. These numbers are displayed in ascending order, and can be precessed as described below in either an ascending or descending manner.

Similarly, the other display areas contain alphabetic information, and the information displayed therein is presented in alphabetic order. As with the numeric information, the alphabetized display information values can be scrolled in a precessing manner in either reverse or forward alphabetic manner.

In FIG. 5, the operator is causing the information values depicted in the first display area (209) to precess in a downward direction by manipulation of the switch (203) bearing the downward oriented arrowhead (204). At the same time as the user manipulates this switch (203), the arrowhead indicia (204) will become illuminated to further confirm operability of the function. Since the switch (203) comprises a variable pressure sensitive switch, the microprocessor (101) can determine the force with which the user presses the switch (203). This information can be utilized to control the precessing rate for the display (209). For example, a light touch could be used to cause relatively slow precessing, whereas firm pressure could be utilized to trigger more rapid scrolling.

It will be noted that, upon initiating the precessing function in this way, the information values will precess through the information value selection area (214) as well as through the surrounding display area. This orientation and presentation strongly suggests to the user that the information value contained within the information value selection area (214) constitutes a selected information value. If desired, the information value selection area (214) could be contrasted in other ways with the surrounding display area as well, through color, different font, or other indicia as may be appropriate to the particular application.

The user can continue the precessing process in the first display area (209) until the desired information value for that field appears. At that time, the switch (203) can be released and the precessing will terminate. An example is depicted in FIG. 6, wherein the user has selected the information value "1303." The user could now enter an information value for the corresponding street by referring to the second display area (211) and the switches that correspond thereto. As before, immediately upon activating either of the input switches, the information values will begin to precess, and this precessing will pass through the information value selection area (214) for that display area (211). For example, as depicted in FIG. 7, the user has selected the switch (203) having the downwardly oriented arrowhead (204), thereby causing the information values for the corresponding display area (211) to precess downwardly. This process continues until the desired information value appears in the information value selection area (214) as depicted in FIG. 8, at which time the user releases the switch (203) and thereby selects the street name "Algonquin."

In an exactly similar manner, town or city information can be selected for the third display area (212) and state information can be selected for the fourth display area (213).

Through provision of the above display (103) and input unit (102), in combination with the controlling microprocessor (101), signal unit (108), and potential destination location information as stored in the CD ROM (106), an inexperienced user will readily and rapidly comprehend the mechanism by which a desired destination location can be entered into the navigation system (100). Little or no training is required to achieve these beneficial results.

It is not necessary that a user first enter information values for the first display area (209). Instead, the user can enter information into any of the fields in any order. Pursuant to this invention, however, information first selected for any of the information fields can be utilized by the microprocessor to limit information that is available for selection in any of the remaining information fields. For example, if a user were first to select a particular town or city in the third display area (212), the street names that would be presented for potential selection in the second display area (211) would, in this embodiment, be limited to only those streets that are actually located in the selected city or town. For example, if the user had selected the town of "Schaumburg," then the street of "Algonquin," could be presented in the second display area (211) as a potential information value that could be selected, because Schaumburg includes a street having this name. On the other hand, although the CD ROM (106) might include the street name "Galvin," the Galvin street name would not be presented as a potentially available street name in the second display area (211) because there is no Galvin street in Schaumburg. This ensures that discrete address elements cannot be combined to thereby yield a nonexistent potential destination location.

A flow diagram depicting one embodiment for implementing the above described activities through the microprocessor (101) and associated peripherals will now be described with reference to FIGS. 9A-C.

At power on (901), the rotation effect, sound effect, and button lighting as described above with reference to FIG. 3 initiates (902), following which the effects terminate and current location information appears above a blank information value selection area as described above with respect to FIG. 4. The microprocessor then enables control of all display fields and internally enters all field numbers into an untouched fields list (903) (indicating that no information values have been selected for any of the fields). The microprocessor then monitors for assertion of the clear button (206) (904), destination selection switches (201) (906), and the enter button (207) (907). Assertion of the clear button (206) (904) will reinitiate the destination selection process described above. Assertion of the destination selection switches (906) or the enter button (907) will result in the activities described below.

With reference to FIG. 9B, upon detecting assertion of a destination selection switch (906), the microprocessor determines the true/false status of three primary constraints. First, the field (n) associated with the display area (208) that corresponds to the asserted destination selection switch (201) must either correspond to an untouched field list (meaning that no values have been previously selected for this particular field), or, if not an untouched field list, a field that constitutes the last field to have been selected (meaning that no other fields have been selected since the current field was most recently selected). Next, the microprocessor determines that the list of information values available for display in this field exceed one. Last, the microprocessor determines that the entries in the field have not precessed in either direction to the end of that particular list. If any of the above conditions test false, the microprocessor asserts an error tone burst (909) or other indication to the user to provide notice that assertion of that particular destination selection switch (201) will not effect a useful event.

Presuming that all of these conditions test true, the microprocessor initiates precession and appropriate accompanying sounds for the selected field responsive to button pressure as described above (911). The microprocessor then removes this particular field from the untouched field list (912) if the field was previously untouched, and assigns the current field as the previous touched field (913). Following this, the microprocessor tests for user release of the destination selection switch (914).

When the destination selection switch has been released, the microprocessor tests to determine if the selected field constitutes a previous touched field. If false, this indicates that one of the original conditional tests (908) described above was not passed, and the microprocessor returns to monitoring for assertion of the clear button, destination selection switches, and enter button as described above with respect to FIG. 9A. Presuming this condition tests true, the microprocessor stops precession of the information values and uses the selected value to narrow the available values for all other fields (917). For example, if an information value of "1303" has been selected for the first display area (209), and if there are no "1303" numeric addresses on Algae Street, then "Algae" will not be considered an available information value for display in the second display area (211), whereas "Alamo" and "Algonquin" will remain in the list of available displayable information values since both of these streets do have an associated 1303 numeric address corresponding thereto.

When the user asserts the enter button (207) (907) (FIG. 9A) (presumably when all of the destination information has been selected), the microprocessor determines whether the size of all selection fields equals one (918) (FIG. 9C). In other words, the microprocessor determines whether a unique address has been selected, such that useful destination information can then be accessed and provided. If false, an error tone burst is asserted (919). Otherwise, the navigation system can begin its route guidance mode (921).

What is claimed is:

1. In a navigation system for use with a moving object, wherein the navigation system includes stored potential destination location information, an improvement wherein:
   A) information for each potential destination location is comprised of a plurality of information fields; and
   B) the navigation system further includes means for specifying desired destination information in conjunction with a user, comprising:
      i) display means for displaying information;
      ii) first input means responsive to the user for receiving user input and for causing the display means to display selected information regarding one of the information fields;
      iii) second input means responsive to the user for subsequently receiving different user input and for causing the display means to subsequently display selected information regarding a different one of the information fields;
      iv) control means responsive to both the first and second input means, for limiting information that can be selected for display on the display means by the second input means from a first set of information item stored within the navigation system to a smaller second set of information items contained within the first set of information items as a function, at least in part, of information selected by the first input means.

2. The improvement of claim 1 wherein the display means has display areas that are segregated from one another and that are each reserved for displaying information from a preselected information field only.

3. The improvement of claim 2 wherein the first input means includes a user operable switch that is positioned substantially proximal to the segregated display area that corresponds to the information field preassociated with the first input means.

4. The improvement of claim 3 wherein the second input means includes a user operable switch that is positioned substantially proximal to the segregated display area that corresponds to the information field preassociated with the second input means.

5. The improvement of claim 1 wherein the information fields each include discrete elements of a potential destination location address.

6. The improvement of claim 5 wherein the control means limits selection of subsequent discrete address elements as a function, at least in part, of previously selected discrete address elements, such that selected discrete address elements cannot be combined to thereby yield a nonexistent potential destination location.

7. The improvement of claim 5 wherein at least one of the discrete elements comprises a telephone number.

8. The improvement of claim 5 wherein at least one of the discrete elements comprises a zip-code.

9. The improvement of claim 5 wherein at least one of the discrete elements comprises a landmark identifier.

10. The improvement of claim 5 wherein at least one of the discrete elements comprises street intersection information.

11. The improvement of claim 5 wherein at least one of the discrete elements comprises a user entered alias.

12. The improvement of claim 5 wherein at least one of the discrete elements comprises an alias for the potential destination location.

13. A method of selecting a destination in a computer based navigation system, wherein the navigation system includes a stored first set of information items including potential destination location information, and location information for each potential destination is comprised of a plurality of information fields; the method comprising the steps of:
   A) displaying on a display at least some of the information fields;
   B) selecting a specific information value from the first set of information items for one information field;
   C) in the computer, automatically limiting, for at least one other information field, information values that can be subsequently selected from the first set of information items to a smaller second set of information items contained within the first set of information items as a function, at least in part, of the specific information value so selected;

D) selecting a specific non-limited information value for the at least one other information field.

14. The method of claim 13 wherein the step of displaying at least some of the information fields includes the step of display different information fields in display areas segregated from one another.

15. The method of claim 13 wherein at least some of the information fields include information that comprises discrete elements of a potential destination address.

16. The method of claim 15 wherein the step of limiting includes the step of limiting, for at least one other information field that comprises a discrete element of a potential destination address, other discrete elements that can be subsequently selected as a function, at least in part, of a previously selected discrete element of a potential destination address, such that selected discrete address elements cannot be combined to thereby yield a nonexistent potential destination location.

* * * * *